(12) United States Patent
Müller et al.

(10) Patent No.: US 6,314,888 B1
(45) Date of Patent: *Nov. 13, 2001

(54) MULTI-STAGE GAS GENERATOR WITH THERMAL UNCOUPLING OF THE PROPELLANT CHARGES

(75) Inventors: Werner Müller, Mühldorf/Inn; Roland Schropp, Tegernheim, both of (DE)

(73) Assignee: TRW Airbag Systems GmbH & Co. KG, Aschau/INN (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,476

(22) Filed: May 18, 1999

(30) Foreign Application Priority Data

May 19, 1998 (DE) .......................... 298 09 062 U

(51) Int. Cl.⁷ .................................................. B60R 21/26
(52) U.S. Cl. ............................. 102/530; 280/741
(58) Field of Search .................... 102/530, 531; 280/736, 741

(56) References Cited

U.S. PATENT DOCUMENTS

| | | | |
|---|---|---|---|
| 4,491,095 | * 1/1985 | Coad | 123/46 R |
| 5,033,390 | * 7/1991 | Minert et al. | 102/530 |
| 5,219,178 | * 6/1993 | Kobari et al. | 280/736 |
| 5,562,303 | * 10/1996 | Schleicher et al. | 280/736 |
| 5,564,743 | * 10/1996 | Marchant | 280/741 |
| 5,794,973 | * 8/1998 | O'Loughlin et al. | 280/737 |
| 5,851,027 | * 12/1998 | Di Giacomo et al. | 280/736 |
| 5,934,705 | * 8/1999 | Siddiqui et al. | 280/736 |
| 5,970,880 | * 10/1999 | Perotto | 102/531 |
| 6,019,389 | * 2/2000 | Burgui et al. | 280/736 |
| 6,042,146 | * 3/2000 | Bauer et al. | 280/737 |
| 6,095,561 | * 8/2000 | Siddiqui et al. | 280/741 |

* cited by examiner

Primary Examiner—Harold J. Tudor
(74) Attorney, Agent, or Firm—Tarolli, Sundheim, Covell, Tummino & Szabo L.L.P.

(57) ABSTRACT

A multi-stage gas generator comprises a housing with an outer wall and also inner walls, at least two combustion chambers filled with at least one propellant charge, one igniter each associated with a propellant charge for the independent activation of each propellant charge, and at least one thermal insulation arrangement between the propellant charges. The arrangement reduces a transport of thermal energy, generated on the ignition of a propellant charge, to the other non-ignited propellant charge to such a high extent that the non-ignited propellant charge remains below its autogenous ignition temperature. Instead of or additionally to the thermal arrangement a cooling arrangement may be provided.

10 Claims, 2 Drawing Sheets

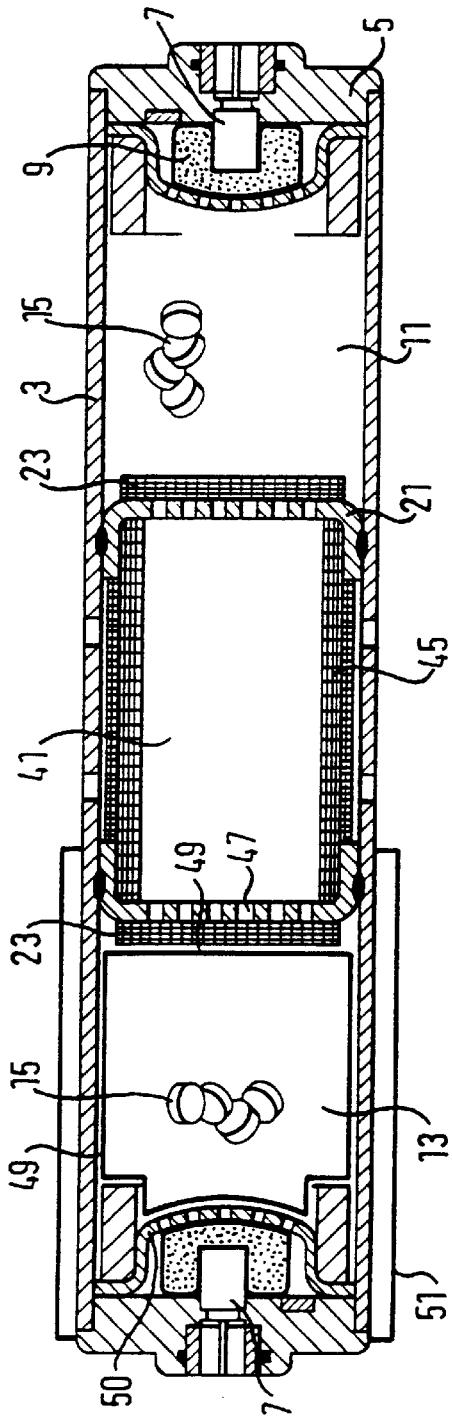

MULTI-STAGE GAS GENERATOR WITH THERMAL UNCOUPLING OF THE PROPELLANT CHARGES

TECHNICAL FIELD

The invention relates to a multi-stage gas generator.

BACKGROUND OF THE INVENTION

Multi-stage gas generators with propellant charges which are able to be ignited independently of each other can generate different quantities of gas, coordinated with vehicle occupants or accident-specific parameters. If only one propellant charge is ignited, the outflowing hot gas automatically heats the outer and inner walls, however, so that heat is passed on to the non-ignited propellant charge. Theoretically, this can lead to the non-ignited propellant charge igniting itself after a few minutes, owing to the relatively slow heat transport. This involves dangers both for the occupant who is still to be found in the vehicle and also for rescue personnel.

BRIEF SUMMARY OF THE INVENTION

The invention provides a multi-stage gas generator, in which this danger can be largely ruled out. The multi-stage gas generator according to the invention comprises a housing with an outer wall and also inner walls, at least two combustion chambers filled with at least one propellant charge, one igniter associated with each propellant charge for the independent activation of each propellant charge, and at least one thermal insulation arrangement between the propellant charges. The arrangement reduces a transport of thermal energy, generated on the ignition of a propellant charge, to the other non-ignited propellant charge to such a high extent that the non-ignited propellant charge remains below its autogenous ignition temperature. Instead of or additionally to the thermal arrangement a cooling arrangement may be provided.

The first solution makes provision that at least one thermal insulation arrangement is provided between the propellant charges. This thermal insulation arrangement reduces the transportation of thermal energy, generated on ignition of one of propellant charges, to another non-ignited propellant charge to such a high extent that the non-ignited propellant charge remains below its autogenous-ignition temperature.

The second solution according to the invention makes provision for at least one cooling arrangement in the region of at least one of the propellant charges. The cooling arrangement thereby uncouples the thermal flow from one ignited propellant charge to another.

According to a development of the invention, the combustion chamber is delimited by a combustion chamber wall. The thermal insulation arrangement consists of an insulating wall which on the inner face covers or lines at least sections or even the entire combustion chamber wall. The insulating wall is of insulating material, preferably plastic, such as polyamide or polyvinylchloride having a low thermal conductivity. Furthermore, ceramic can also be used as insulating material.

Preferably the gas generator is a tubular gas generator with two combustion chambers arranged at opposite ends of the tube and with at least one filter chamber arranged between the combustion chambers. According to the preferred embodiment, each combustion chamber has its own filter chamber, the filter chambers being arranged between the combustion chambers. Between the filter chambers, in turn, the thermal insulation arrangement is provided, by which the filter chambers are spaced apart from each other. In this intermediate space between the filter chambers, insulating material or gas, such as air for example, can provide for an appreciable thermal uncoupling of the filter chambers and hence of the two halves of the gas generator. Furthermore, a vacuum provided between the filter chambers can also provide for such a thermal uncoupling.

BRIEF DESCRIPTION OF THE DRAWINGS

FIG. 2 shows a longitudinal sectional view through a tubular gas generator according to a second embodiment, with a common filter chamber and a cooling arrangement, and FIG. 3 shows a longitudinal sectional view through the left half of a tubular gas generator according to a third embodiment.

Detailed Description of Preferred Embodiments

Figure 1:
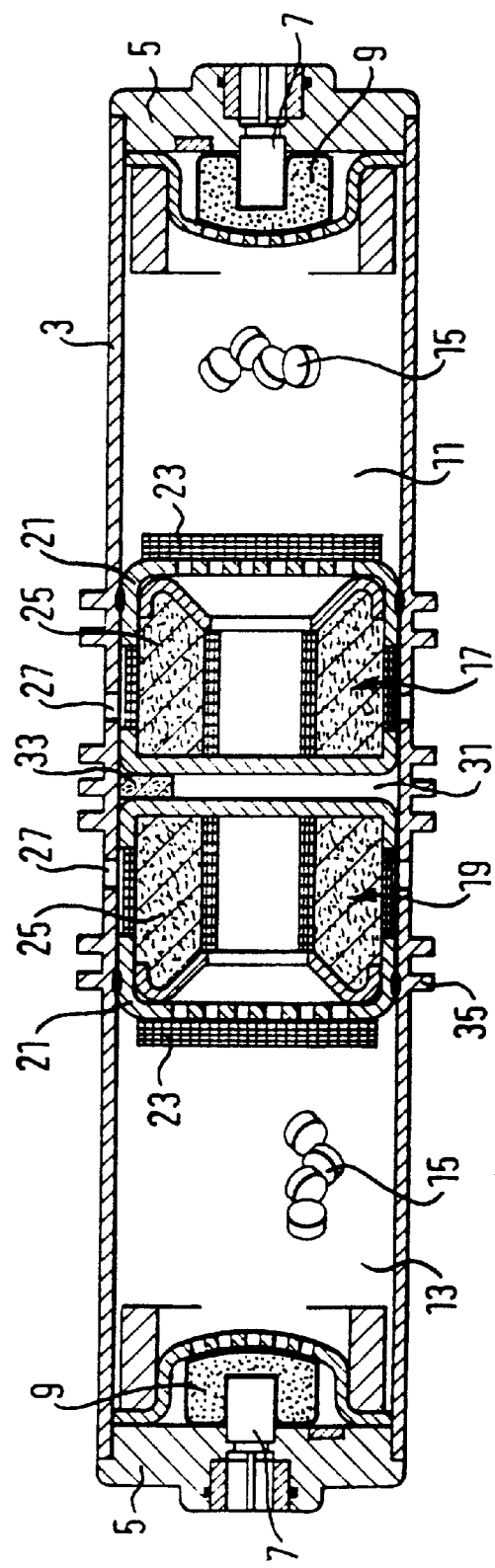
FIG. 1 shows a longitudinal sectional view through a tubular gas generator according to the invention in accordance with a first embodiment, with two separate filter chambers.

In FIG. 1 a tubular gas generator is shown with a tubular outer wall, hereinafter named tube 3. At the axial ends, igniters 7 are provided which are integrated into the cover plates 5 and are surrounded by a booster propellant charge 9. The gas generator has two combustion chambers 11 and 13, which are filled with propellant charges 15, the combustion chambers 11, 13 having a different volume. Each combustion chamber 11, 13 has its own internal filter chamber 17 or 19, which is defined by an individual, multiple-part wall 21. At the same time, the wall 21 forms the combustion chamber wall in the section to the combustion chamber. A filter 23 lies upstream of the inlet openings to each filter chamber in each combustion chamber 11, 13. A filter set 25 is likewise provided in each filter chamber 17, 19. The housings 21 have radial outlet openings which open into outlet openings 27 in the tube 3.

The two filter chambers 17, 19 are separated from each other by an intermediate space 31 which forms or holds a thermal insulation arrangement. In the case which is shown, this thermal insulation arrangement is the intermediate space 31 together with the air contained in it, which impedes a heat transmission from one filter chamber to the adjacent filter chamber. Furthermore, however, a vacuum can also be provided in the intermediate space 31 and thus the heat transport can be made more difficult once again. Another possibility, as already indicated in the upper part of the intermediate space 31, consists in filling the intermediate space 31 in FIG. 1 at least partially with insulating material 33. Ceramic or plastic such as PA or PVC present themselves as insulating material and form an insulation wall.

In the region of the filter chambers, the tube 3 has externally radially projecting ribs 35 which form a cooling arrangement.

The mode of operation of the multiple-stage generator which is shown is explained hereinbelow. If a minor accident occurs, only the left-hand propellant charge 15 is ignited, which has a smaller volume than the right-hand propellant charge. The gas flows through the filter 23 into the interior of the filter chamber 19 and there through the filter set 25 via the outflow openings 27 into a vehicle occupant restraint system, such as for example a gas bag or a belt tensioner. As the tubular gas generator which is shown is not a hybrid gas generator but rather a purely pyrotechnic gas generator, the emerging gases are very hot. The wall 21 is therefore heated, just as the tube 3. However, a heat emission into the environment already takes place via the ribs 33, so that relatively little heat arrives up to the right-hand propellant charge 15 via the tube. Despite the very large opposite sections of the walls 21 of the filter chambers 17, 19, only relatively little heat transport takes place to the right-hand filter chamber 17 owing to the thermal insulation arrangement which is provided, so that an autogenous ignition of the propellant charge 15 situated in the combustion chamber 11 can not take place at usual ambient temperatures between −40 and +100° C.

In the embodiment shown in FIG. 2, instead of the two filter chambers 17, 19 a common filter chamber 41 is provided, into which gas can flow from both combustion chambers 11, 13. Compared with the filter chambers 17, 19, the filter chamber 41 has only one filter 45 of relatively small mass, so that in this part, connecting the two combustion chambers, not too much thermal energy is received, which could then be directed to the non-ignited propellant charge. On the inner face of the walls 21 in the region of the through-flow openings 47, a metal foil, ceramic paper or a fleece 49 is provided, which covers the through-flow openings 47 and can only be destroyed from the inside, i.e. from the associated combustion chamber 11 or 13 but not via the filter chamber 41. Thereby, an overflowing of hot gas into the non-ignited combustion chamber is prevented. In this embodiment the left-hand propellant charge 15 is largely thermally uncoupled from the right-hand propellant charge 15 both by a thermal insulation arrangement and also by a cooling arrangement. The thermal insulation arrangement is formed by the ceramic paper 49 which represents an insulating wall of insulating material and into which the left-hand propellant charge 15 is packed. The ceramic paper 49 adjoins the combustion chamber wall, which is formed partly by the tube 3, partly by the filter 23 and partly by a wall 50 towards the igniter 7. The cooling arrangement 51 comprises a hollow body surrounding the tube 3 in the region of the left-hand propellant charge 15 and containing cooling fluid.

In the embodiment illustrated in FIG. 3, a ceramic tube piece is inserted, as thermal insulation arrangement, into the combustion chamber 13. The ceramic tube piece, which is designated by 53, lies directly against the inner face of the tube 3 and furthermore adjoins the wall 21 to the filter chamber 41. The tube piece 53 forms an insulating wall which impedes a heat transition from the combustion chamber 13 on ignition of its propellant charge 15 via the tube 3 to the combustion chamber 11, just as in reverse a heat transition via the tube 3 to the left-hand propellant charge 15 owing to the ignition of the right-hand propellant charge 15. Depending on the length of the tube 3 and of the filter chamber 41 and also the capacity of the propellant charges, the tube 53 can be constructed relatively short or can even extend over the entire length of the combustion chamber 13.

What is claimed is:

1. A multi-stage gas generator, comprising:
   an outer housing with a cylinder outer wall centered on an axis,
   at least spaced apart first and second combustion chambers in said housing, each combustion chamber being filled with a propellant charge;
   each one of said combustion chambers having an associated igniter for the independent activation of each propellant charge; and
   first and second filter housings centered on said axis and located between said first and second combustion chambers;
   said first filter housing having a first filter chamber containing a first cylindrical filter centered on said axis, a first wall permitting first gas flow into the first filter chamber from said first combustion chamber, a second wall spaced from said second filter housing, and first gas flow openings for directing said first gas flow radially from said first filter chamber, said first gas flow being directed radially through said first cylindrical filter;
   said second filter housing having a second filter chamber containing a second cylindrical filter centered on said axis, a third wall permitting second gas flow from said second combustion chamber into said second filter chamber, a fourth wall spaced from said second wall, and second gas flow openings for directing said second gas flow radially from said second filter chamber, said second gas flow being directed radially through said second cylindrical filter;
   at least one thermal insulation arrangement between said second and fourth walls, which arrangement reduces a transport of thermal energy, to the other non-ignited propellant charge such that said non-ignited propellant charge remains below its autogenous ignition temperature, and where said first and second filter housings are arranged between said combustion chambers in a manner that gas is prevented from flowing from one filter chamber to the other filter chamber.

2. The multi-stage gas generator according to claim 1, wherein said gas generator is a tubular gas generator with two combustion chambers arranged at opposite ends of said tube.

3. The multi-stage gas generator according to claim 1, wherein the thermal insulation arrangement comprises at least one of the following means:
   insulating material;
   gas; and
   vacuum.

4. The multi-stage gas generator according to claim 1, wherein said insulating material consists of one of plastic or ceramic.

5. The multi-stage gas generator according to claim 1, wherein said outer housing has protruding cooling ribs.

6. A multi-stage gas generator, comprising:
   a housing with an outer wall and also inner walls;
   at least two combustion chambers filled with a propellant charge;
   one igniter associated with each one of said combustion chambers for the independent activation of each propellant charge; and
   at least one thermal insulation arrangement between said propellant charges, which arrangement reduces a transport of thermal energy, generated on the ignition of a propellant charge, to the other non-ignited propellant charge to such a high extent that said non-ignited propellant charge remains below its autogenous ignition temperature, wherein each combustion chamber has its own filter chamber, and wherein said filter chambers are arranged between said combustion chambers and are spaced apart by said thermal insulation arrangement wherein an intermediate space between said two filter chambers has a vacuum.

7. A multi-stage gas generator, with a housing with external and also internal walls, at least two combustion chambers filled with a propellant charge, one igniter associated with each one of said combustion chambers for the independent activation of each propellant charge, and at least one cooling arrangement which at least partially surrounds said housing adjacent at least one of said combustion chambers, said cooling arrangement reducing a transport of thermal energy, generated on the ignition of a propellant charge, to the other non-ignited propellant charge to such a high extent that said non-ignited propellant charge remains below its autogenous ignition temperature, wherein said cooling arrangement includes cooling ribs protruding from said external wall.

8. The multi-stage gas generator according to claim 7, wherein at least one thermal insulation arrangement between said propellant charges is provided.

9. The multi-stage gap generator according to claim 7, wherein said gas generator is a tubular gas generator with said two combustion chambers arranged at opposite ends of said tube.

10. The multi-stage gas generator according to claim 9, wherein the thermal arrangement comprises at least one of the following means:

insulating material;

gas; and vacuum.

* * * * *